United States Patent
Lawrence (10) Patent No.: US 8,601,840 B2
(45) Date of Patent: Dec. 10, 2013

(54) VEHICULAR WHEEL LOCK

(75) Inventor: Richard Lawrence, Fremont, CA (US)

(73) Assignee: Richard Lawrence, Fremont, CA (US)

( * ) Notice: Subject to any disclaimer, the term of this patent is extended or adjusted under 35 U.S.C. 154(b) by 0 days.

(21) Appl. No.: 12/120,218

(22) Filed: May 13, 2008

(65) Prior Publication Data

US 2008/0282754 A1 Nov. 20, 2008

Related U.S. Application Data (60) Provisional application No. 60/930,328, filed on May 14, 2007.

(51) Int. Cl.
*B60R 25/00* (2013.01)

(52) U.S. Cl.
USPC ..................... 70/226; 292/259 R (58) Field of Classification Search
USPC .......... 70/225–227, 14, 18; 188/220.1, 220.6, 188/69, 32; 292/259 R
See application file for complete search history.

(56) References Cited

U.S. PATENT DOCUMENTS

| | | | | |
|---|---|---|---|---|
| 543,547 | A | | 7/1895 | Geistwite |
| 1,443,009 | A | * | 1/1923 | Davis ............... 70/226 |
| 1,488,893 | A | * | 4/1924 | Plouffe ............ 70/226 |
| 1,504,220 | A | * | 8/1924 | Degen .............. 70/227 |
| 3,245,239 | A | * | 4/1966 | Zaidener .......... 70/202 |
| 3,664,164 | A | * | 5/1972 | Zaidener .......... 70/202 |
| 3,959,995 | A | | 6/1976 | Fletcher |
| 4,175,410 | A | * | 11/1979 | Schwaiger ....... 70/226 |
| 4,666,106 | A | * | 5/1987 | Kohout ........... 244/129.3 |
| 4,688,408 | A | * | 8/1987 | Shroyer .......... 70/226 |
| 4,696,449 | A | | 9/1987 | Woo et al. |
| 4,896,519 | A | | 1/1990 | Pitts |
| 5,052,198 | A | | 10/1991 | Watts |
| 5,109,683 | A | | 5/1992 | Cartwright |
| 5,133,201 | A | * | 7/1992 | LaMott et al. ..... 70/226 |
| 5,134,868 | A | * | 8/1992 | Bethards .......... 70/18 |
| 5,265,449 | A | * | 11/1993 | Rashleigh ......... 70/18 |
| 5,265,451 | A | * | 11/1993 | Phifer ............. 70/226 |
| 5,271,636 | A | * | 12/1993 | Mohrman et al. ... 280/304.1 |
| 5,329,793 | A | | 7/1994 | Chen |
| 5,463,885 | A | * | 11/1995 | Warren, Sr. ....... 70/18 |
| 5,520,030 | A | * | 5/1996 | Muldoon .......... 70/14 |
| 5,582,044 | A | | 12/1996 | Bolich |
| 5,724,839 | A | * | 3/1998 | Thering ........... 70/18 |
| 5,730,008 | A | | 3/1998 | Case et al. |
| 5,802,887 | A | | 9/1998 | Beland |
| 5,899,101 | A | * | 5/1999 | West .............. 70/238 |
| 5,899,509 | A | * | 5/1999 | Ferguson et al. ... 292/259 R |
| 5,927,108 | A | * | 7/1999 | Pierce ............ 70/19 |
| 6,000,255 | A | * | 12/1999 | Lester ............ 70/226 |
| 6,012,739 | A | | 1/2000 | Weiss et al. |
| 6,058,749 | A | * | 5/2000 | Rekemeyer ....... 70/226 |
| 6,112,560 | A | * | 9/2000 | Mabee ............ 70/14 |

(Continued)

*Primary Examiner* — Kristina Fulton (74) *Attorney, Agent, or Firm* — James E. Eakin (57) ABSTRACT

A vehicle lock for substantially immobilizing the wheels of a vehicle includes an extensible bar with a pair of shafts affixed at either end thereof. Each shaft is configured to pass through an orifice on a wheel of a vehicle. A portion of the shaft extends through the associated orifice, and a locking mechanism is affixed to the exposed end of the shaft. In an embodiment the shaft is rigidly affixed to the extensible bar, and in other embodiments the shafts are connected to the bar by means a flexible connection that allows the user to change the orientation of the shafts relative to the bar.

27 Claims, 7 Drawing Sheets

(56) References Cited

U.S. PATENT DOCUMENTS

| | | |
|---|---|---|
| 6,240,753 B1 | 6/2001 | Wu |
| 6,334,345 B1 * | 1/2002 | Lee ................................. 70/209 |
| 6,553,797 B2 * | 4/2003 | Witchey ........................ 70/209 |
| 6,672,115 B2 * | 1/2004 | Wyers ............................. 70/14 |
| 6,796,154 B2 * | 9/2004 | Gebow et al. .................. 70/226 |
| 6,938,734 B2 * | 9/2005 | Curl ............................... 188/32 |
| 6,941,780 B1 * | 9/2005 | Marr .............................. 70/226 |
| 7,174,752 B2 | 2/2007 | Galant |
| 7,249,475 B2 * | 7/2007 | Yu .................................. 70/18 |
| 7,743,634 B1 * | 6/2010 | Lawrence et al. ................ 70/14 |
| 2004/0089036 A1 * | 5/2004 | Gebow et al. .................. 70/226 |
| 2005/0252258 A1 * | 11/2005 | Peacock ......................... 70/226 |
| 2006/0081025 A1 * | 4/2006 | Smith et al. .................... 70/226 |
| 2008/0282754 A1 * | 11/2008 | Lawrence ...................... 70/226 |

* cited by examiner

VEHICULAR WHEEL LOCK

RELATED APPLICATION

This application claims the benefit of U.S. Provisional Application Ser. No. 60/930,328, filed May 14, 2007, having the same title and inventor as the present application, and incorporated herein by reference.

FIELD OF THE INVENTION

The present invention relates generally to vehicular locking mechanisms, and more particularly relates to vehicular locking mechanisms which substantially immobilize the wheels.

BACKGROUND OF THE INVENTION

Theft of vehicles is an ongoing problem. This is particularly true of small, easily transported vehicles such as ATV's. Such vehicles tend to be relatively small and light, such that one or two people can easily roll even a locked vehicle into a truck or trailer. As a result, many thefts of vehicles such as ATV's are crimes of opportunity, and could be avoided if the vehicle were not so easily moved.

At the same time, any locking mechanism which would immobilize the vehicle must also be easily locked onto and unlocked from the vehicle. In addition, it should preferably be light and small enough that it can be carried with the vehicle for use in remote locations. This combination of factors has proven elusive in the prior art, and thus there has been a long felt need for a vehicular locking mechanism meeting these criteria.

SUMMARY OF THE INVENTION

The present invention provides an elegantly simple locking mechanism meeting the foregoing criteria. A pair of shafts are connected by an extensible bar. The shafts are configured to pass through an orifice in the wheels of a vehicle, such as those commonly found on the wheels of ATV's and the like. The shafts are configured to permit a portion of the shaft to be exposed on the opposite side of the wheel. A locking mechanism affixes to the exposed portion of each of the shaft, thus preventing the wheels of the vehicle from rotating. A sleeve or other bushing can be provided for placement on the shafts between the locking mechanism and the bar, to minimize the ability to saw through the shafts. A washer or plate can also be provided to minimize access to the shaft as well as the orifices through the wheels.

Various alternative embodiments are provided whereby the wheels may be locked along one side, across front or back, or diagonally.

DETAILED DESCRIPTION OF THE INVENTION

Figure 1:
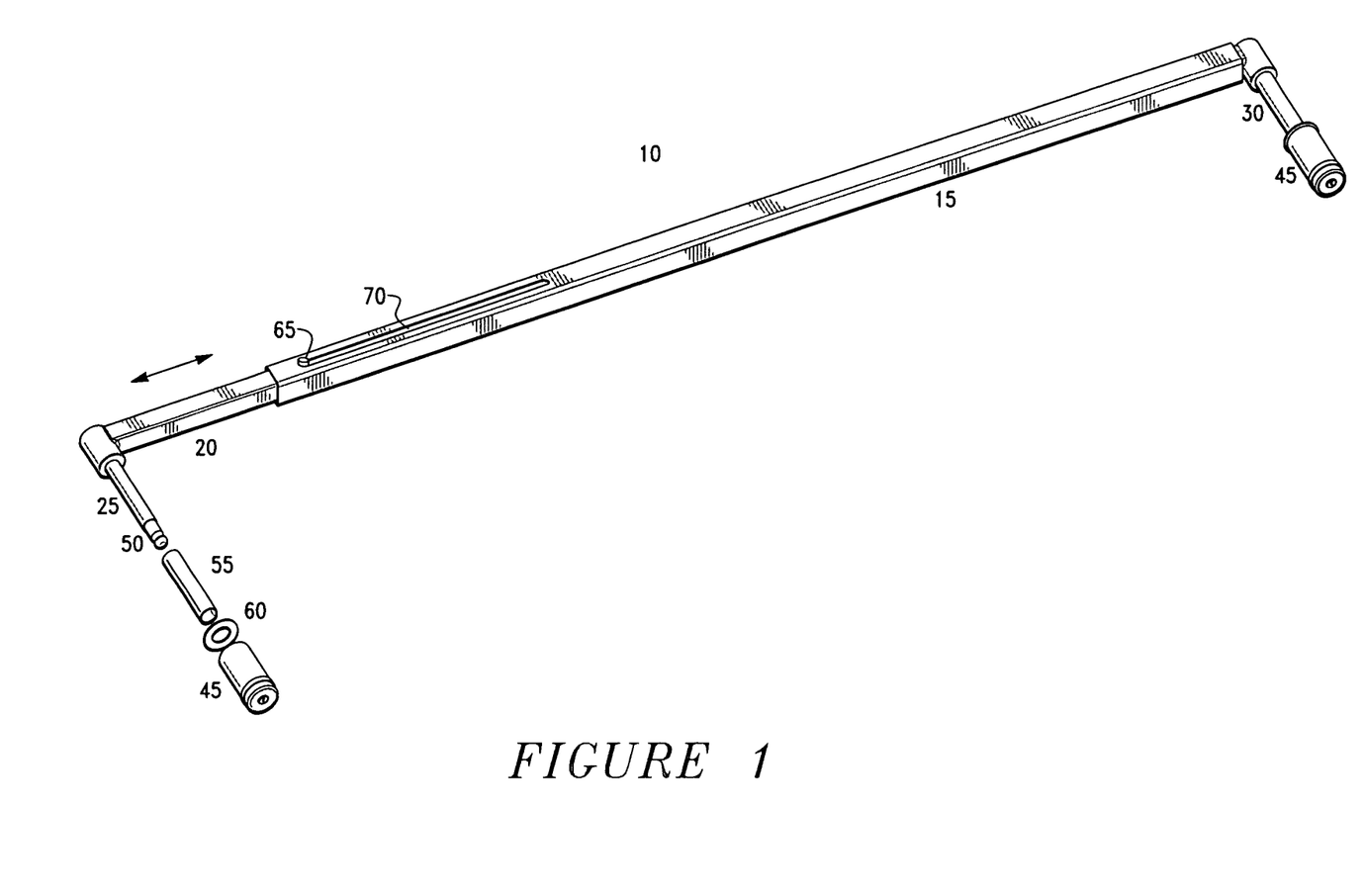
FIG. 1 illustrates an embodiment of the present invention suitable for use on the wheels on one side of a vehicle.
Figure 2:
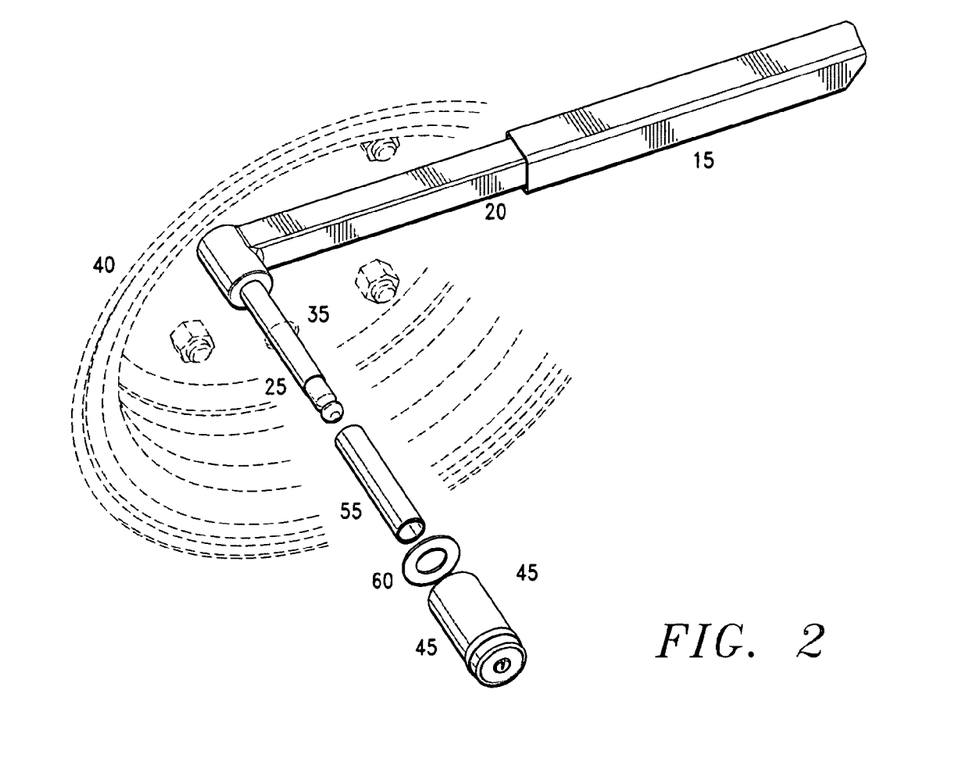
FIG. 2 illustrates the embodiment of FIG. 1 as applied to the wheel of a vehicle.

Referring first to FIGS. 1 and 2, a first embodiment of the present invention can be appreciated. An extensible bar 10 comprises an outer tube 15 and an inner tube 20, whereby the inner tube 20 is permitted to slide within the outer tube 15 to permit the user to adjust the bar 10 to a length appropriate to permit a pair of shafts 25 and 30 to fit through orifices 35 [FIG. 2] on the wheels 40 of a vehicle. In the arrangement shown, the shafts 25 and 30 are affixed orthogonally to the long dimension of the bar and are essentially parallel to one another. It will be appreciated that, although the tubes 15 and 20 are shown as having a square or rectangular cross-section, any cross-section is suitable. In addition, the bar, or either tube, can be made of any suitably durable material, including steel, hardened steels and alloys, titanium, aluminum or other metals, but also including any other materials that are not readily broken or cut. The shafts 25 and 30 can also be made from a similar variety of materials, and in some instances will preferably be made from hardened steel, and can be of any suitable cross-section, and not just the circular cross-section illustrated.

As can be appreciated particularly from FIG. 2, the shafts 25 and 30 extend through the orifices 35 on the wheels 40 of the vehicle (not shown), which can, for example, be an ATV but could be any type of wheeled vehicle. In a typical implementation, the bar is placed through the wheels from the back, making access to the bar more difficult, although the bar can be configured for use from either side of the wheels simply by ensuring that the shafts are of a suitable length to permit a portion thereof to extend through the orifices. A locking mechanism 45 is then placed over the exposed ends of the shafts. In the implementation shown, the locking mechanism 45 encloses the end of the shaft and is actuated by a key, but any form of locking mechanism which affixes the bar through the orifices 35 is suitable. A recessed portion 50 on the shafts permits retention of the locking mechanism until removed by the user.

To prevent the shafts from being sawn through, a sleeve or bushing 55 can be provided. The sleeve 55 slips over the shaft and rolls if a thief attempts to saw through the shaft. The sleeve can be made of any suitable material, although a material resistant to saw cuts is particularly suitable for some embodiments. Depending upon the implementation, the sleeve can extend through the orifice to the junction of the shaft with the bar, or can extend only from the locking mechanism to the orifice in the wheel. In addition, a plate or washer 60 can be provided between the locking mechanism and the sleeve.

To limit the extension of the bar, a pin and slot arrangement can be provided in the bar 10, as shown in FIG. 1. A pin 65 slides in a slot 70, such that the travel of the inner tube 15 is limited. In one embodiment, the relative positions of the limiting mechanism can be adjusted to permit a user to preset the extended length of the bar so that the extended length fits the distance between the orifices of the wheels on the vehicle. While a limiter in the form of a pin and slot arrangement is shown, it will be appreciated that such a limiter is not required in every embodiment. Further, other arrangements can also be used, including a cable, which can be connected inside the tubes 15 and 20 to constrain the extension of the bar 10.

Figure 3:
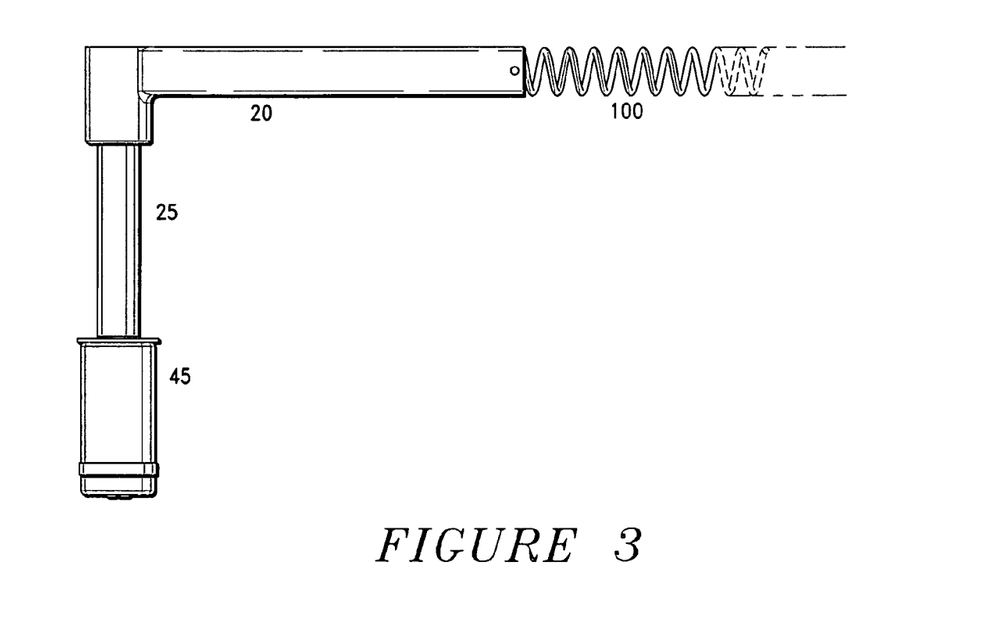
FIG. 3 illustrates a spring mechanism for causing the bar to extend from a length suitable for storage to a length appropriate for locking the vehicle.

Referring next to FIG. 3, a mechanism for extending the bar can be appreciated. In the example shown, a spring mechanism 100 is affixed to the inner tube and slipped within the outer tube, such that, upon release, the inner tube extends outward in accordance with the length of the spring. It will be appreciated that such a spring mechanism is not required in all embodiments.

Figure 4:
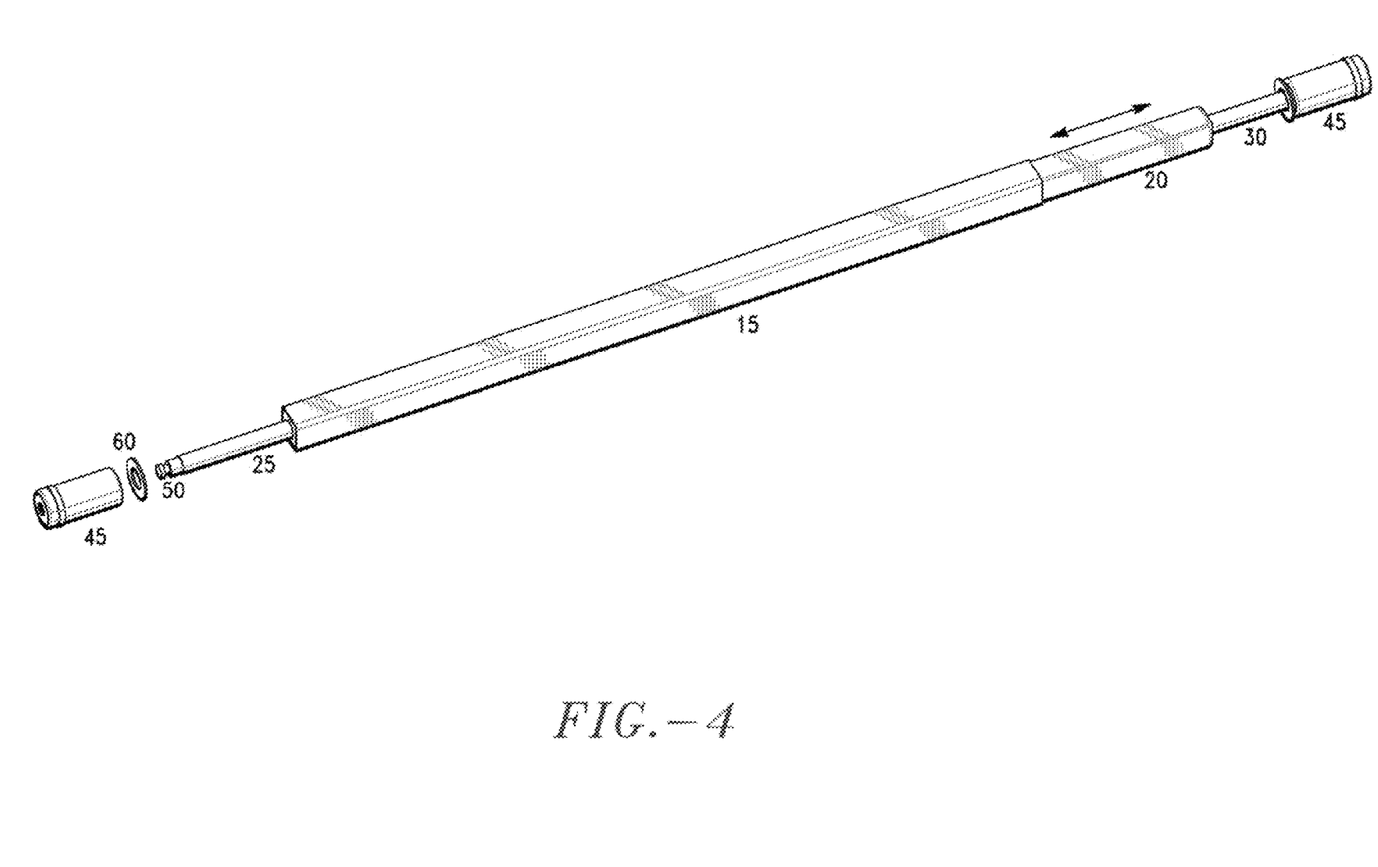
FIG. 4 illustrates an alternative embodiment of the invention suitable for locking either front or back wheels of a vehicle.
Figure 5:
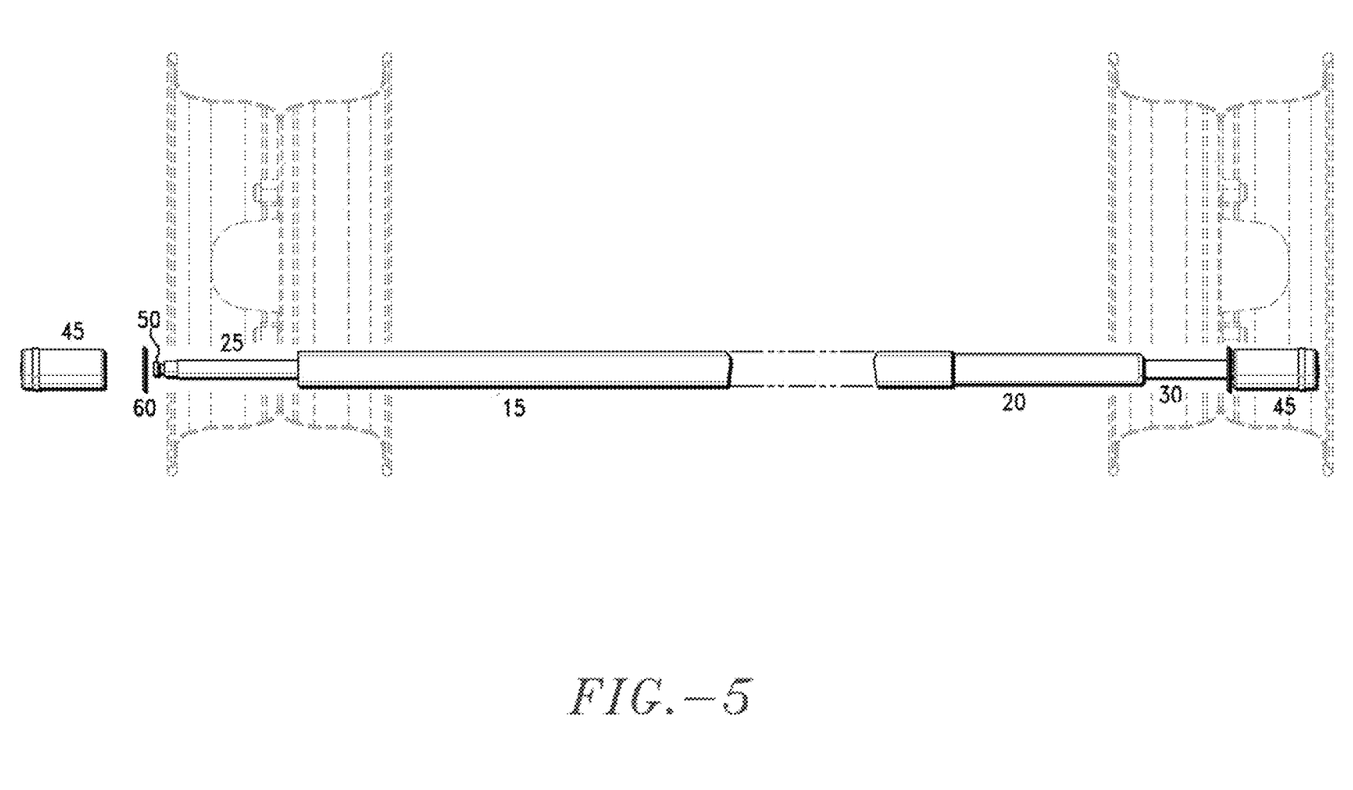
FIG. 5 illustrates the embodiment of FIG. 4 as applied to the wheels of a vehicle.

Referring next to FIGS. 4 and 5, an alternative embodiment is shown which is suitable for locking both front wheels or both back wheels. For purposes of clarity, like elements will be identified with like reference numerals. In this arrangement, the shafts 25 and 30 extend straight outward from the bar 10, and thus pass directly outward through the orifices 35 in the wheels 40, as best seen in FIG. 5. While not explicitly shown in the Figures, it will be appreciated that each of the features discussed in connection with FIGS. 1-3 can also be implemented in the embodiment shown in FIGS. 4 and 5.

Figure 6:
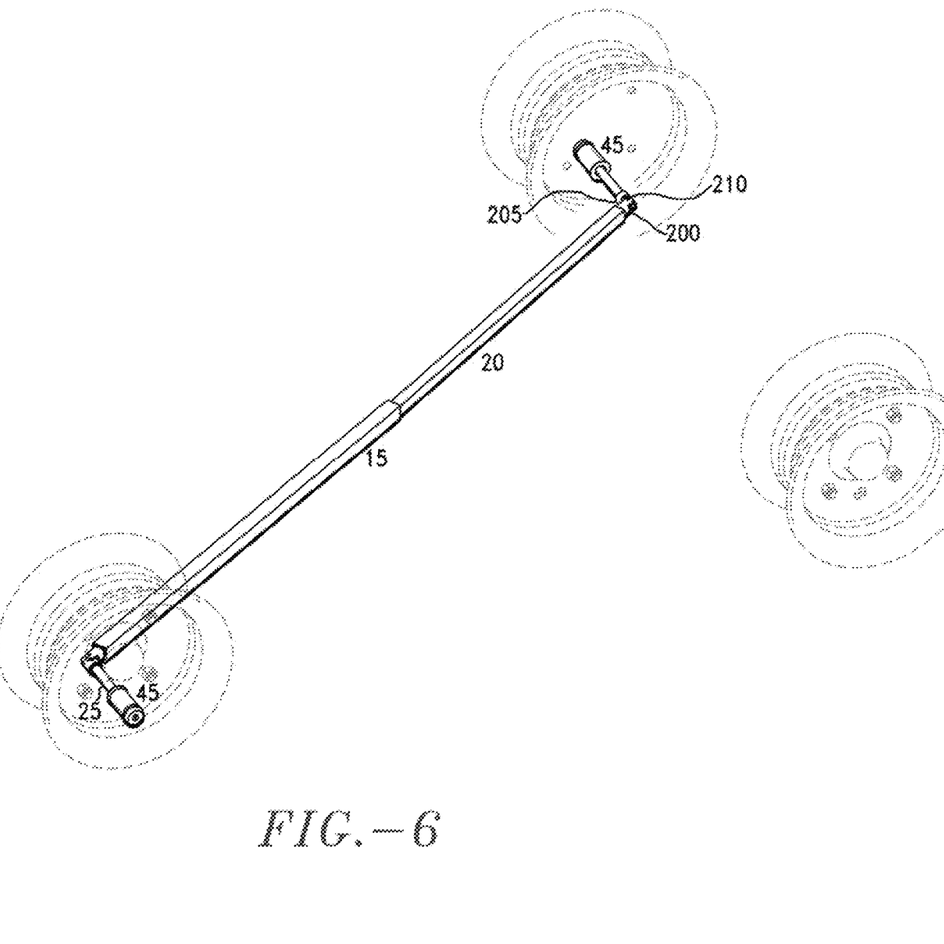
FIG. 6 illustrates another embodiment of the invention suitable for locking any pair of wheels on the vehicle, including side, front/back, or diagonal.
Figure 7:
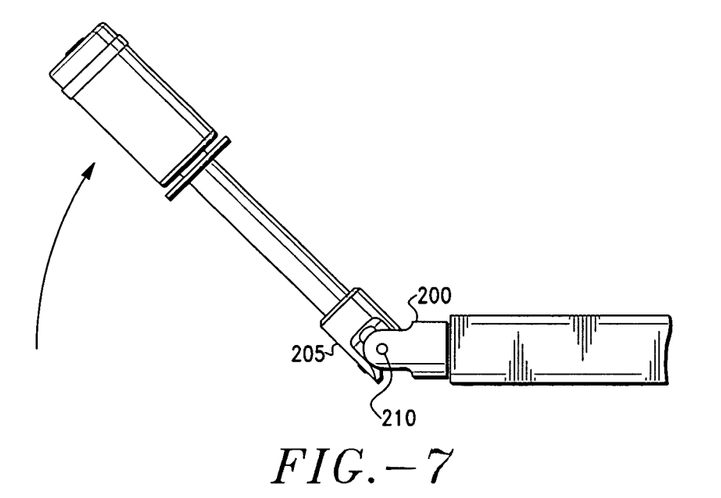
FIG. 7-9 illustrate the rotating joint portion of the embodiment of FIG. 6.
Figure 8:
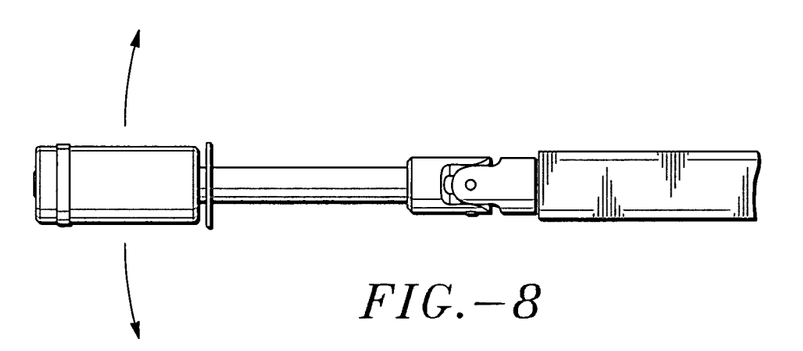
Figure 9:
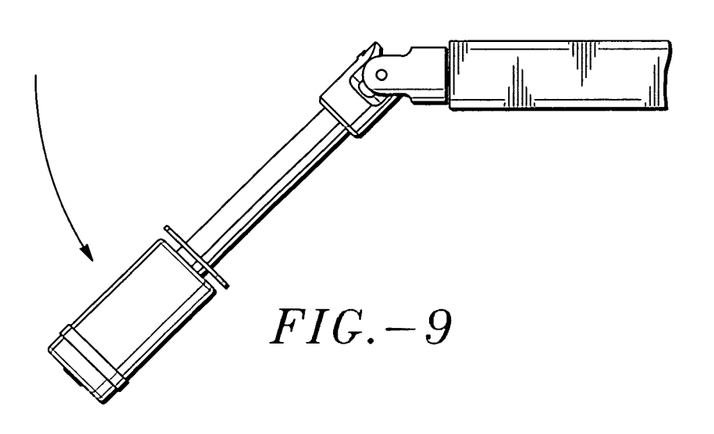

Referring next to FIGS. 6-9, a further alternative embodiment is shown which can be used to lock diagonal wheels, but can also be used to lock either side wheels or front or back wheels. As shown in FIGS. 7-9, the shafts are coupled to the bar through a flexible joint, whereby a first portion 200 is either fixedly or rotatably affixed to an end of the bar 10. The first portion is coupled to a mating portion 205 by means of a pin 210 or other suitable connection, such that angles of the shafts 25 and 30 can be changed. As shown in FIG. 6, this more easily permits the shafts to be adjusted to fit through the orifices of diagonally opposed wheels. It will also be appreciate that, instead of the rotatable shaft arrangement of FIGS. 7-9, the shafts can be rigidly affixed to the bar 10 at angles suitable for passing the shafts through the orifices 35.

Figure 10:
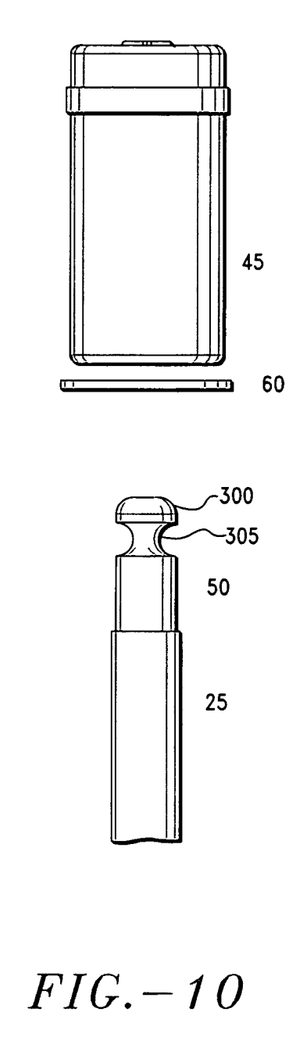
FIGS. 10-11 illustrates alternative embodiments for the shafts and associated locking mechanisms.
Figure 11:
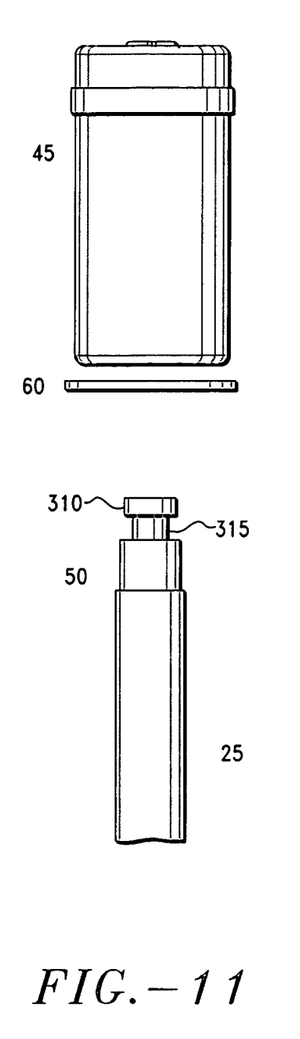

Referring next to FIGS. 10 and 11, the recessed portion 50 on the ends of the shafts 25 and 30 can be better appreciated. Depending upon the locking mechanism, the end 300 of the recessed portions can be arcuate with an arcuate recess 305, as shown in FIG. 10, or can be flat on the end 310 and flat in the recess 315 as shown in FIG. 11.

Having fully described a preferred embodiment of the invention and various alternatives, those skilled in the art will recognize, given the teachings herein, that numerous alternatives and equivalents exist which do not depart from the invention. It is therefore intended that the invention not be limited by the foregoing description, but only by the appended claims.

I claim:

1. A vehicular locking mechanism for vehicles having at least two wheels comprising
   an extensible bar having two ends,
   a first shaft of a rigid material connected at an angle that extends other than straight outward from one end of the extensible bar,
   a second shaft of a rigid material connected at an angle that extends other than straight outward from the other end of the extensible bar,
   end portions on each of the first and second shafts for passing through an orifice in the wheels of a vehicle to be locked,
   locking mechanisms affixable to the end portions which retain the bar in a connected position across at least any two wheels of the vehicle, including side, front and back, and diagonal wheels when in the locked position with the end portions passed through the orifices in the wheels.

2. The vehicular locking mechanism of claim 1 further comprising a bushing positioned between the locking mechanisms and the wheels.

3. The vehicular locking mechanism of claim 1 wherein the first and second shafts are orthogonally affixed to a long dimension of the extensible bar.

4. The vehicular locking mechanism of claim 1 where the first and second shafts are rotatably affixed to the extensible bar.

5. The vehicular locking mechanism of claim 1 wherein the first and second shafts are connected to the extensible bar by a flexible joint.

6. A locking mechanism for locking at least two wheels of an all terrain vehicle (ATV) comprising an extensible bar having two ends, first and second shafts of a rigid material attached to either end of the extensible bar, a mechanism for changing a first shaft orientation and a second shaft orientation relative to an orientation of the extensible bar, end portions on each of the first and second shafts for passing through an orifice of wheels to be locked, locking mechanisms affixable to the end portions which secure the shafts to any two wheels to be locked, including side, front and back, and diagonal wheels when in the locked position with the end portions passed through the orifices in the wheels.

7. The locking mechanism of claim 6 wherein the mechanism for changing the first and second shaft orientations is a flexible joint at each of the two ends of the flexible bar.

8. The locking mechanism of claim 7 wherein the flexible joints are fixedly affixed to each of the two ends of the extensible bar.

9. The locking mechanism of claim 7 wherein the flexible joints are rotatably affixed to each of the two ends of the extensible bar.

10. The locking mechanism of claim 7 wherein the flexible joint comprises a first portion rotatably affixed to an end of the extensible bar and a second portion rotatably affixed to the first portion.

11. The locking mechanism of claim 10 wherein the first portion comprises a pin and the second portion is rotatably affixed to the pin.

12. The locking mechanism of claim 7 wherein each of the flexible joints comprises a first portion fixedly attached to an end of the extensible bar and a second portion rotatably affixed to the first portion.

13. The locking mechanism of claim 12 wherein the first portion comprises a pin and the second portion is rotatably affixed to the pin.

14. The locking mechanism of claim 5 wherein a flexible joint is attached to each of the two ends of the extensible bar, each flexible joint comprises a first portion fixedly attached to an end of the extensible bar and a second portion rotatably affixed to the first portion.

15. The locking mechanism of claim 5 wherein a flexible joint is attached to each of the two ends of the extensible bar, each flexible joint comprises a first portion rotatably attached to an end of the extensible bar and a second portion rotatably affixed to the first portion.

16. The locking mechanism of claim 14 wherein the first portion further comprises a pin and the second portion rotates on the pin.

17. The locking mechanism of claim 15 wherein the first portion further comprises a pin and the second portion rotates on the pin.

18. A vehicular locking mechanism for a vehicle having at least two wheels comprising
   an extensible bar having two ends, a flexible joint at each end of the extensible bar, each of the flexible joints comprising a first section rotatably affixed to the extensible bar and a second section rotatably affixed to the first section, a first shaft affixed to the second section of the flexible joint at one end of the extensible bar, a second shaft affixed to the other second section at the other end of the extensible bar, end portions on each of the first and second shafts for passing through an orifice in the wheels of a vehicle to be locked, the first and second sections of the flexible joints providing two degrees of motion to orient the end portions of the first and second shafts to fit through the orifices of any two wheels to be locked, including side, front and back, and diagonally opposed wheels, and locking mechanisms affixable to the end portions which retain the bar in a connected position across the any two wheels to be locked when in the locked position with the end portions passed through the orifices in the wheels.

19. The vehicular locking mechanism of claim 18 wherein each of the first sections of the flexible joints further comprises a pin and each of the second sections rotates on the pin.

20. In a vehicular locking device having a bar extending between two wheels along one side, or across the front or back, of a vehicle, the bar being extensible, having two ends each with a shaft that extends other than straight outward from the bar, end portions on the shafts that pass through an orifice in the wheels of the vehicle, and locking mechanisms affixable to the end portions; wherein the improvement comprises rotatably affixed shafts which locks diagonally-placed vehicular wheels in addition to wheels along one side, or across the front or back of the vehicle when in the locked position with the end portions passed through the orifices in the wheels.

21. The vehicular locking mechanism of claim 20 further comprising a bushing positioned between the locking mechanisms and the wheels.

22. The vehicular locking mechanism of claim 20 wherein the first and second shafts are orthogonally affixed to a long dimension of the extensible bar.

23. The vehicular locking mechanism of claim 20 wherein the first and second shafts are connected to the extensible bar by a flexible joint.

24. The locking mechanism of claim 20 wherein a flexible joint is attached to each of the two ends of the extensible bar, each flexible joint comprises a first portion fixedly attached to an end of the extensible bar and a second portion rotatably affixed to the first portion.

25. The locking mechanism of claim 20 wherein a flexible joint is attached to each of the two ends of the extensible bar, each flexible joint comprises a first portion rotatably attached to an end of the extensible bar and a second portion rotatably affixed to the first portion.

26. The locking mechanism of claim 24 wherein the first portion further comprises a pin and the second portion rotates on the pin.

27. The locking mechanism of claim 25 wherein the first portion further comprises a pin and the second portion rotates on the pin.

* * * * *